(12) United States Patent
Han

(10) Patent No.: US 8,477,447 B1
(45) Date of Patent: *Jul. 2, 2013

(54) ASYMMETRY CORRECTION IN READ SIGNAL

(75) Inventor: Ke Han, Fremont, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/357,406

(22) Filed: Jan. 24, 2012

Related U.S. Application Data

(60) Division of application No. 12/901,087, filed on Oct. 8, 2010, now Pat. No. 8,120,870, which is a continuation of application No. 12/405,161, filed on Mar. 16, 2009, now Pat. No. 7,817,368, which is a division of application No. 11/092,095, filed on Mar. 28, 2005, now Pat. No. 7,511,910, which is a continuation-in-part of application No. 10/976,110, filed on Oct. 27, 2004, now Pat. No. 7,298,570.

(60) Provisional application No. 60/622,428, filed on Oct. 27, 2004.

(51) Int. Cl.
*G11B 5/035* (2006.01)

(52) U.S. Cl.
USPC .............. 360/65; 360/25; 360/46; 360/67; 360/77.02

(58) Field of Classification Search
None
See application file for complete search history.

(56) References Cited

U.S. PATENT DOCUMENTS

| | | | |
|---|---|---|---|
| 5,121,260 A | 6/1992 | Asakawa et al. | |
| 5,392,295 A | 2/1995 | Coker et al. | |
| 5,418,660 A * | 5/1995 | Sato et al. | 360/65 |
| 5,583,706 A | 12/1996 | Dudley et al. | |
| 5,585,975 A | 12/1996 | Bliss | |
| 5,744,993 A * | 4/1998 | Sonntag | 327/307 |
| 5,790,335 A | 8/1998 | Sugawara et al. | |
| 5,917,855 A | 6/1999 | Kim | |
| 5,931,966 A | 8/1999 | Carley | |
| 5,970,091 A | 10/1999 | Nishida | |
| 5,999,355 A | 12/1999 | Behrens et al. | |
| 6,043,943 A | 3/2000 | Rezzi et al. | |
| 6,052,248 A | 4/2000 | Reed et al. | |
| 6,141,167 A | 10/2000 | Nishida et al. | |
| 6,141,390 A | 10/2000 | Cova | |
| 6,201,832 B1 | 3/2001 | Choi | |
| 6,324,144 B1 * | 11/2001 | Won et al. | 369/59.15 |
| 6,332,205 B1 | 12/2001 | Conway | |
| 6,385,239 B1 | 5/2002 | Okamoto et al. | |
| 6,396,254 B1 | 5/2002 | Feyh et al. | |
| 6,400,518 B1 | 6/2002 | Bhaumik et al. | |
| 6,449,110 B1 * | 9/2002 | DeGroat et al. | 360/46 |

(Continued)

*Primary Examiner* — Dismery Mercedes

(57) ABSTRACT

Systems and techniques relating to interpreting signals on a channel having an asymmetrical signal amplitude response are described. A described system includes an asymmetry correction circuit configured to receive an analog signal and to compensate for asymmetry in the received analog signal, a signal equalizer configured to receive an input signal responsive to an output of the asymmetry correction circuit and to generate an equalized signal, a discrete time sequence detector operable to examine the equalized signal, and a control circuit operable to provide a coefficient adjustment to the asymmetry correction circuit to affect asymmetry compensation based on an estimate of nonlinearity derived from the equalized signal and multiple reconstructed ideal channel output values. The reconstructed ideal channel output values can be derived from an output of the discrete time sequence detector and correspond to at least two different discrete times.

21 Claims, 4 Drawing Sheets

U.S. PATENT DOCUMENTS

| | | |
|---|---|---|
| 6,493,403 B1 | 12/2002 | Ashley et al. |
| 6,519,103 B2 | 2/2003 | Cyrusian |
| 6,519,106 B1 | 2/2003 | Goh et al. |
| 6,529,340 B2 | 3/2003 | Gowda et al. |
| 6,532,122 B1 | 3/2003 | Sugawara et al. |
| 6,587,292 B1 | 7/2003 | Ashley et al. |
| 6,597,650 B2 * | 7/2003 | Katakura et al. ............ 369/59.22 |
| 6,600,615 B1 | 7/2003 | Ashley et al. |
| 6,614,841 B1 | 9/2003 | Ohta |
| 6,678,110 B2 | 1/2004 | Ellis |
| 6,693,863 B2 | 2/2004 | Shoji et al. |
| 6,714,603 B2 | 3/2004 | Ashley et al. |
| 6,735,724 B1 | 5/2004 | McClellan |
| 6,798,832 B1 | 9/2004 | Nakata et al. |
| 6,810,485 B2 * | 10/2004 | McEwen et al. ............... 713/503 |
| 6,842,303 B2 | 1/2005 | Ichihara et al. |
| 6,853,509 B2 | 2/2005 | Ashley et al. |
| 6,977,970 B2 | 12/2005 | Shim et al. |
| 7,012,772 B1 * | 3/2006 | Vis .................................. 360/46 |
| 7,035,601 B2 | 4/2006 | Karjalainen et al. |
| 7,061,848 B2 | 6/2006 | Shim |
| 7,092,180 B2 | 8/2006 | Franck |
| 7,173,784 B2 | 2/2007 | Cideciyan et al. |
| 7,203,013 B1 * | 4/2007 | Han et al. ........................ 360/46 |
| 7,215,631 B2 | 5/2007 | Horibe et al. |
| 7,256,724 B2 | 8/2007 | Lee |
| 7,256,954 B2 | 8/2007 | Serizawa |
| 7,298,570 B1 | 11/2007 | Han |
| 7,330,141 B2 | 2/2008 | Temerinac et al. |
| 7,495,854 B2 * | 2/2009 | Hutchins et al. ................ 360/46 |
| 7,511,910 B1 | 3/2009 | Han |
| 7,548,389 B1 | 6/2009 | Han |
| 7,817,368 B1 | 10/2010 | Han |
| 7,885,031 B1 | 2/2011 | Han |
| 8,094,400 B1 | 1/2012 | Han |
| 2002/0057508 A1 * | 5/2002 | Seng et al. ...................... 360/46 |
| 2004/0179629 A1 * | 9/2004 | Song et al. .................... 375/296 |
| 2004/0190404 A1 | 9/2004 | Konishi et al. |
| 2005/0213241 A1 | 9/2005 | Cideciyan et al. |
| 2005/0226346 A1 | 10/2005 | Ode et al. |
| 2006/0083330 A1 | 4/2006 | Nagata et al. |

* cited by examiner

ASYMMETRY CORRECTION IN READ SIGNAL

CROSS REFERENCE TO RELATED APPLICATIONS

This application is a divisional of and claims the benefit of priority under 35 USC 120 of U.S. application Ser. No. 12/901,087, filed Oct. 8, 2010 and entitled "ASYMMETRY CORRECTION IN READ SIGNAL", which is a continuation of and claims the benefit of priority under 35 USC 120 of U.S. application Ser. No. 12/405,161, filed Mar. 16, 2009 and entitled "ASYMMETRY CORRECTION IN READ SIGNAL" (issued as U.S. Pat. No. 7,817,368) which is a divisional of and claims the benefit of priority under 35 USC 120 of U.S. application Ser. No. 11/092,095, filed Mar. 28, 2005 and entitled "ASYMMETRY CORRECTION IN READ SIGNAL" (issued as U.S. Pat. No. 7,511,910), which is a continuation-in-part application of and claims the benefit of priority to U.S. application Ser. No. 10/976,110, filed Oct. 27, 2004, and entitled "ASYMMETRY CORRECTION IN READ SIGNAL" (issued as U.S. Pat. No. 7,298,570), and which claims the benefit of the priority of U.S. Provisional Application Ser. No. 60/622,428, filed Oct. 27, 2004 and entitled "A NEW ADAPTATION SCHEME FOR ASYMMETRY CORRECTION FOR MAGNETIC RECORDING CHANNELS." The disclosures of the prior applications are considered part of (and are incorporated by reference in) the disclosure of this application.

TECHNICAL FIELD

The present disclosure describes systems and techniques relating to signal processing, for example, interpreting readback signals obtained from a magnetic storage medium.

BACKGROUND

Signal processing circuits are frequently used to read storage media and interpret obtained analog signals as discrete values stored on the media. For magnetic storage media, a transducer head may fly on a cushion of air over a magnetic disk surface. The transducer converts magnetic field variations into an analog electrical signal. The analog signal is amplified, converted to a digital signal and interpreted (e.g., using maximum likelihood techniques, such as using a Viterbi detector). Tracking of stored data during a read operation is frequently performed using feedback or decision aided gain and timing control. Additionally, perpendicular magnetic recording techniques can be used to increase the amount of data stored on a magnetic medium, and post-processing techniques can be used to detect and correct errors made by the main detector in magnetic recording systems.

The head-media combination in typical magnetic recording systems has associated transfer characteristics that include an asymmetrical signal amplitude response, where an input signal having equivalent amplitudes on the positive and negative sides of the waveform results in an output signal having different amplitudes on the positive and negative sides of the waveform. Such amplitude asymmetry has been compensated for by adding to a readback signal an asymmetry adjustment signal, which is the readback signal squared and then scaled by a controlled asymmetry factor. The controlled asymmetry factor has previously been based on a comparison of the positive peak value with the negative peak value in the readback signal, which thus minimizes amplitude error at the peak values.

SUMMARY

The present disclosure includes systems and techniques relating to interpreting signals on a channel having an asymmetrical signal amplitude response. According to an aspect of the described systems and techniques, a signal processor, such as a read channel transceiver device usable in a magnetic recording system, includes an asymmetry correction circuit configured to receive an analog signal and to compensate for asymmetry in the received analog signal, a signal equalizer configured to receive an input signal responsive to an output of the asymmetry correction circuit and to generate an equalized signal, a discrete time sequence detector operable to examine the equalized signal, and a control circuit that provides a coefficient adjustment to the asymmetry correction circuit to affect the asymmetry compensation based on an estimate of nonlinearity derived from the equalized signal and multiple output values of the discrete time sequence detector, the multiple output values being values corresponding to at least two different discrete times.

The coefficient adjustment can include one or more values received by the asymmetry correction circuit to control the asymmetry compensation. These values can be coefficient values or coefficient adjustment values (e.g., a coefficient adjustment can be a coefficient value $q_{k+1}$ or a coefficient adjustment value $\mu \cdot \beta$, when the coefficient value is generated according to $q_{k+1} = q_k + \mu \cdot \beta$, as described further below). The asymmetry correction circuit, the signal equalizer, the discrete time sequence detector and the control circuit can form at least a portion of a read channel in a storage access device, and the analog signal can be a readback signal obtained from a storage medium.

The multiple output values of the discrete time sequence detector can include values corresponding to discrete times that fall both before and after a current time. The control circuit can be configured to derive the estimate of nonlinearity from the equalized signal and multiple asymmetry indicators, where an asymmetry indicator includes a product of two reconstructed, ideal channel output values.

The asymmetry indicators can be selected based on a comparison of multiple, converged, asymmetry matrices generated for different targets for modeling signal nonlinearity caused by magnetic recording channel asymmetry. The different targets can include a DC target and a DC-free target. The control circuit can include a programming interface configured to enable program control over relative contributions of the multiple asymmetry indicators.

The asymmetry indicators can include a common-time indicator and a separated-time indicator, the common-time indicator including a square of a reconstructed, ideal channel output value, and the separated-time indicator including a product of two reconstructed, ideal channel output values corresponding to different discrete times. The control circuit can include a programming interface configured to enable separate program control over relative contributions of the common-time indicator and the separated-time indicator.

The coefficient adjustment can include one or more values received by the asymmetry correction circuit to control the asymmetry compensation, the one or more values being generated at least in part according to an equation, $q_{k+1} = q_k + \mu_1 \beta - \mu_2 \chi$ where $q_k$ is an asymmetry correction coefficient at time k, $\mu_1$ and $\mu_2$ are programmable step sizes, $\beta_{k+1} = \beta_k + \mu_b \cdot (y_k^r - y_k^a) \cdot y_k^d \cdot (y_{k+1}^d - y_{k-1}^d)$, $\chi_{k+1} = \chi_k + \mu_c \cdot (y_k^r - y_k^a) \cdot y_k^d \cdot y_k^d$, $\mu_b$ and $\mu_c$ are step sizes, $y^r$ corresponds to the equalized signal, $y^d$ corresponds to an estimated ideal channel output derived from the output of the discrete time sequence detector, and $y^a$ corresponds to an estimated real equalized channel output with asymmetry taken into account.

According to another aspect of the described systems and techniques, a system includes a storage medium; a head assembly operable to obtain an analog signal from the storage medium; an asymmetry correction circuit configured to receive the analog signal and to compensate for asymmetry in the received analog signal; a signal equalizer configured to receive an input signal responsive to an output of the asymmetry correction circuit and to generate an equalized signal; a discrete time sequence detector operable to examine the equalized signal; and a control circuit operable to provide a coefficient adjustment to the asymmetry correction circuit to affect the asymmetry compensation based on an estimate of nonlinearity derived from the equalized signal and multiple output values of the discrete time sequence detector, the multiple output values being values corresponding to at least two different discrete times.

According to yet another aspect of the described systems and techniques, a method includes compensating for asymmetry in an analog signal based on at least one coefficient adjustment; equalizing a digital signal obtained by sampling the analog signal; detecting a data sequence in the digital signal; reconstructing an ideal target channel output from the detected data sequence; and modifying the at least one coefficient adjustment to affect the asymmetry compensation based on an estimate of nonlinearity derived from the digital equalized signal and multiple output values of the reconstructed ideal target channel output, the multiple output values being values corresponding to at least two different discrete times. The method can further include deriving the estimate of nonlinearity from the digital equalized signal and multiple asymmetry indicators selected based on a comparison of multiple, converged, asymmetry matrices generated for different targets for modeling signal nonlinearity caused by magnetic recording channel asymmetry, an asymmetry indicator comprising a product of two reconstructed, ideal channel output values. Additionally, the method can further include controlling relative contributions of the multiple asymmetry indicators based on programmed input, wherein the asymmetry indicators include a common-time indicator and a separated-time indicator.

The described systems and techniques can be implemented in electronic circuitry, computer hardware, firmware, software, or in combinations of them, such as the structural means disclosed in this specification and structural equivalents thereof, including a software program operable to cause one or more machines to perform the operations described.

The described systems and techniques can result in improved asymmetry correction in a read channel of a storage device, allowing a larger portion of the dynamic range of the head-media combination to be used. Nonlinearity observed over multiple discrete time units on the digital side of a read channel can be used to provide a feedback signal that controls the asymmetry correction applied on the analog side of the read channel. The total output signal can be considered in optimizing one or more coefficients applied in an asymmetry correction circuit.

The systems and techniques described can employ a straight forward equation to calculate an error term for the adaptation of an asymmetry correction coefficient, and can be applied to many different target channels (e.g., a perpendicular magnetic recording channel or a longitudinal magnetic recording). Control of the asymmetry correction can be made programmable, allowing extensive flexibility in adjusting the asymmetry correction employed in a channel in light of a specific application for the channel. For example, a read channel transceiver device can be designed for use with both direct current (DC) targets and DC-free targets, where the asymmetry correction can be programmed to provide optimal results for a given target. Thus, the asymmetry correction can be tailored to a particular target channel of interest.

Details of one or more implementations are set forth in the accompanying drawings and the description below. Other features, objects and advantages may be apparent from the description and drawings, and from the claims.

DRAWING DESCRIPTIONS

DETAILED DESCRIPTION

Figure 1:
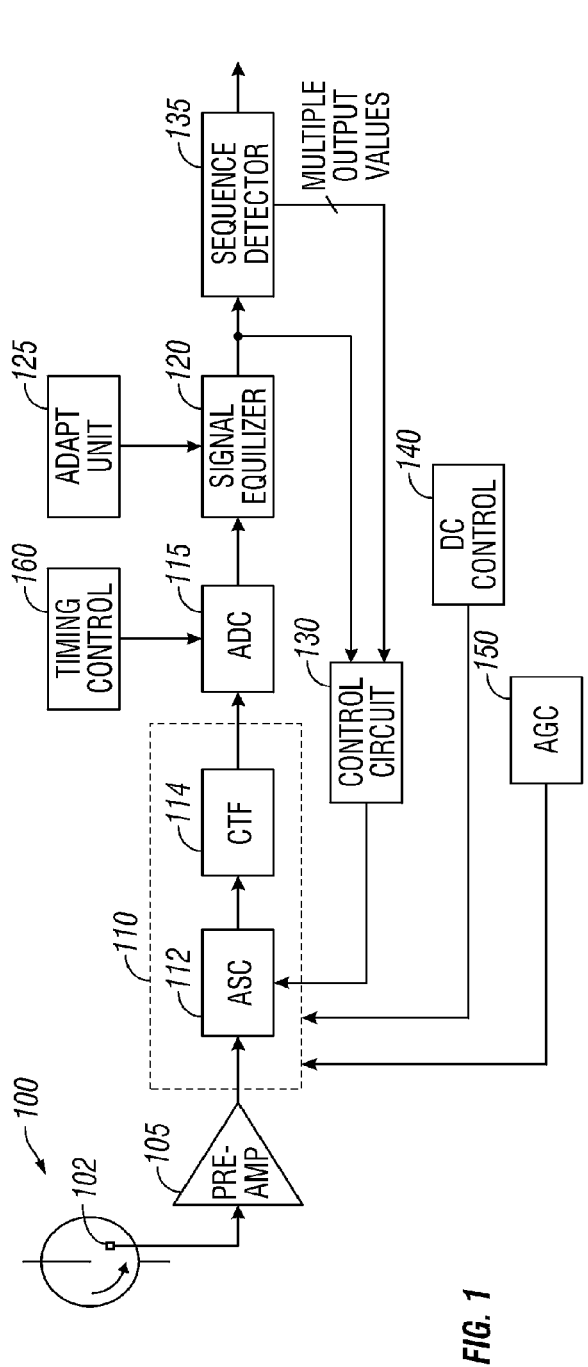
FIG. 1 is a block diagram showing a read channel in a storage system that performs amplitude asymmetry correction.

FIG. 1 is a block diagram showing a read channel in a storage system that performs amplitude asymmetry correction. The storage system includes a storage medium 100 and read head 102. The storage medium can be read-only or read/write media and can be magnetic-based, optical-based, semiconductor-based media, or a combination of these. Examples of the storage medium include hard disk platters in a hard disk drive, a floppy disk, a tape, and an optical disk (e.g., laser disk, compact disk, digital versatile disk). The storage medium is depicted in FIG. 1 as a disk for illustration only; the systems and techniques described herein can be used with other storage media types or in non-storage applications (e.g., communications equipment).

The read head 102 can be part of a read-write head assembly that reads the storage media 100 under the control of a servo or actuator. An analog readback signal is generated and can be sent to a pre-amplifier 105. The system can include an analog front end (AFE) 110, which can provide filtering and gain control. The AFE 110 can have inputs from both a DC control unit 140 and an automatic gain control (AGC) unit 150, and the AFE 110 can include a variable-gain amplifier (VGA), which can be regulated by the AGC 150.

The AFE 110 includes an asymmetry correction circuit (ASC) 112 configured to receive the analog readback signal and to compensate for asymmetry in the analog readback signal based on a coefficient adjustment received from a control circuit 130, such as a least mean squared (LMS) control circuit described below. The AFE 110 can also include a differentiator and a continuous time filter (CTF) 114.

The storage system can employ perpendicular magnetic recording (PMR) techniques, and a differentiator can be used in the AFE 110 to differentiate the readback signal to make the signal look like that from a longitudinal magnetic recording (LMR) channel (the first derivative of a PMR readback waveform can correspond to what an LMR readback waveform would look like for the same data pattern). Thus, the remainder of the read channel can then be designed just as done for LMR. The differentiator can be a bypassable differentiating circuit, which can be either a separate component in the AFE 110 or integrated into another component of the AFE 110. For example, the differentiator can be integrated into the CTF 114, which can have a program parameter that allows differentiation to be turned on and off. Also, when reading PMR using differentiation, a direct current (DC) free target should be used (as discussed further below) because the differentiation removes the DC components in the signal.

An analog to digital converter (ADC) 115 converts the readback signal from continuous-time domain to discrete-time domain, and a signal equalizer 120 shapes the signal to a desired target response. The ADC 115 can be a 6-bit ADC. The signal equalizer 120 can be a finite impulse response (FIR) digital filter, such as a 9-tap or 10-tap FIR, which can be programmable or adaptive. For example, the system can include an adaptation unit 125 that provides a control input to the signal equalizer 120. Moreover, a CTF, ADC and FIR taken together can be viewed as the signal equalizer within the read channel; in general, the main function of the CTF is noise filtering (e.g., filtering out the unwanted out-of-band noise), but the CTF can also provide some equalization.

A discrete time sequence detector 135 examines and interprets its input as discrete values stored on the media 100. Timing control circuitry, including a timing control unit 160, a phase locked loop (PLL), or both, can be used to regulate the filtered signal provided to the detector 135, and the DC control unit 140 can also apply a DC correction at one or more locations in the main read path. The sequence detector 135 can include one or more components, such as a Viterbi detector. The main read path can combine partial-response equalization with maximum-likelihood sequence detection (PRML) using a discrete-time approach (e.g., the class-IV partial response target (PR-IV)).

An output of the sequence detector 135 can be provided to a post processor, such as a media noise processor (MNP) that identifies and corrects errors in a detected sequence. As will be appreciated, multiple components can be included after the component that obtains the binary sequence from the output of the signal equalizer, and these multiple components can be separate electronic components or integrated into a single sequence detector 135. For example, a single Viterbi detector component in a read channel can be used to obtain the binary sequence and also to reconstruct the ideal target channel output as described further below, or a Viterbi detector component can be used to obtain the binary sequence and another component (e.g., MNP), which is responsive to an output of the Viterbi detector component, can be used to reconstruct the ideal target channel output.

In general, multiple output values of the sequence detector 135, such as output values coming directly from the sequence detector 135 or from a post processor, is provided to a control circuit 130. The control circuit 130 provides the coefficient adjustment to the ASC 112 to affect the asymmetry compensation based on an estimate of nonlinearity derived from the equalized signal and the multiple output values of the discrete time sequence detector.

Figure 2:
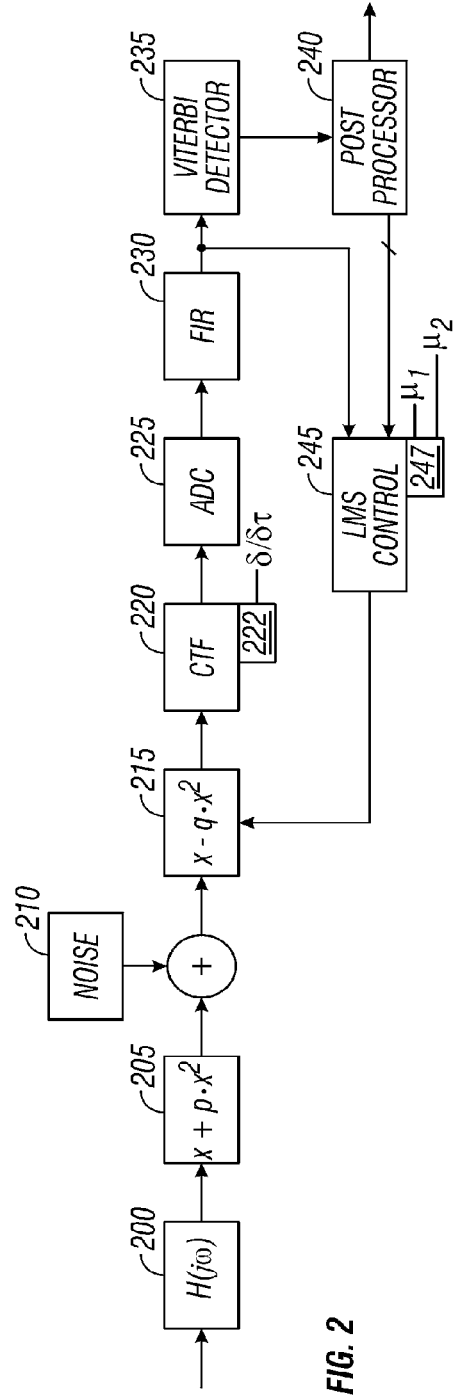
FIG. 2 is a block diagram illustrating the introduction of nonlinearity in the readback signal and the subsequent compensation for this nonlinearity.

FIG. 2 is a block diagram illustrating the introduction of nonlinearity in the readback signal and the subsequent compensation for this nonlinearity. H(jω) 200 represents the transfer characteristics of the head-media combination, absent asymmetry. An asymmetry component 205 represents the asymmetry introduced by the head when reading the media. This asymmetry adds nonlinear component(s) to the signal and can thus be represented by the following polynomial: $x + p_2 \cdot x^2 + p_3 \cdot x^3 + p_4 \cdot x^4 + \ldots$, where x is the readback signal, and $p_2, p_3, p_4, \ldots$ are the amounts of higher order nonlinearity added to the signal. Typically, the second order term of the asymmetry polynomial is the most significant high order term. Various portions of the description below addresses asymmetry correction using only the linear term and the second order term, but the systems and techniques described are also applicable to higher order asymmetry corrections.

Noise 210 is added (this can be electronic noise in the channel and can also partially come from the head-media combination). An ASC 215 compensates for the asymmetry by applying an asymmetry correction based on a model of the asymmetry in the channel. This asymmetry correction can be represented by the following polynomial: $x - q_2 \cdot x^2 - q_3 \cdot x^3 - q_4 \cdot x^4 \ldots$. The asymmetry correction employed by the ASC 215 can be limited to the second order $(x - q \cdot x^2)$ or additional higher order terms can be included in the asymmetry correction. In general, one or more coefficients, $q_2, q_3, q_4, \ldots$, are adjusted so as to cancel the corresponding nonlinear elements in the readback signal. The nonlinearity introduced by the ASC 215 thus counteracts the nonlinearity introduced into the readback signal by the head-media combination, before passing the readback signal on to a CTF 220 (which can include a programmable differentiator 222) and an ADC 225.

The one or more coefficients can be decided adaptively, on the fly, to counteract nonlinearity in the readback signal as it is observed. An LMS control circuit 245 can actively adjust the one or more coefficients used by the ASC 215 based on an estimate of nonlinearity derived from the output of an FIR 230 and multiple output values from a post processor 240. The FIR output provides a signal that reflects the nonlinearity in the channel, and a Viterbi detector 235 provides preliminary decision bits to the post processor 240, which reconstructs the ideal target channel output used to calculate the error signal in the LMS control circuit 245. Moreover, the Viterbi detector 235 and the post processor 240 can be integrated into a single detector that reconstructs the ideal channel output.

The read channel can be used in both LMR and PMR applications, and the read channel can be used with various target polynomials (which may be selected as desired for the specific application). In the case of PMR with differentiation, as described above, the read signal can be converted into a form that looks like that seen in LMR, and a large portion of the read channel can be designed in the manner appropriate for LMR. In this case, the target polynomial can be a DC-free target.

A typical DC-free target is [5, 3, −3, −3, −2]. Since asymmetry correction is the signal aspect being addressed here, the rest of the channel can be assumed to be ideal (e.g., any additive white noise can be disregarded because it does not affect the asymmetry processing being described), and the FIR equalizer can be assumed to be doing a perfect job in equalizing the signal to the target. The signal asymmetry is reflected at the FIR output, and thus the FIR output indicates the asymmetry in the signal. The FIR output can be used to decide how adjustments to the asymmetry correction should be made to cancel that asymmetry. Processing the equalized signal in the discrete time domain allows generation of one or more indicators of the asymmetry, which can be used to better correct for the asymmetry in the continuous time domain.

The asymmetry in the signal passes through the CTF, ADC and FIR. Thus, the effect of the asymmetry is spread out in time during processing of the signal. Once the signal reaches the FIR 230, the prior application of the asymmetry 205 is in some sense spread out into a period of time instead of appearing at only one point in time. To model this type of nonlinearity, a matrix model can be used. Using a sufficiently large enough matrix, the effect of the spreading of the nonlinearity in the channel can be modeled very accurately.

For example, the asymmetry can be modeled by a quadratic form equation as follows:

$$y_k^a = \overline{B}_k^T \cdot \Gamma' + \overline{B}_k^T \cdot \Lambda' \cdot \overline{B}_k = \hat{Y}_k^T \cdot \Gamma + \hat{Y}_k^T \cdot \Lambda \cdot \hat{Y}_k \quad (1)$$

where $\overline{B}_k$ is a vector of the binary input bits, $\hat{Y}_k$ is a vector of the ideal FIR output samples, and superscript T indicates the vector is transposed; $\Gamma'$ and $\Gamma$ are both one-column matrices characterizing the linear part of the signal; $\Lambda'$ and $\Lambda$ are both square matrices characterizing the nonlinear part of the signal.

The first term, $\overline{B}_k^T \cdot \Gamma'$, is the linear term that characterizes the linear relationship between the FIR output and the binary input. The second term, $\overline{B}_k^T \cdot \Lambda' \cdot \overline{B}_k$, is a quadratic form, so there are two vectors of binary input on both sides of a square matrix. Thus, this equation gives the modeled relationship between the FIR output and the binary input to the head-media channel.

In addition, the second part of the equation gives the modeled relationship between the FIR output and the ideal FIR output, which is readily available in the channel. The quadratic form equation models the relationship between the true FIR output and the ideal FIR output. $\hat{Y}_k$ is a vector of ideal FIR output. Expanding this vector to clarify the notation:

$$\hat{Y}_k = \begin{bmatrix} y_{k-N}^d \\ \vdots \\ y_k^d \\ \vdots \\ y_{k+N}^d \end{bmatrix} \quad (2)$$

$\hat{Y}_k$ is a vector of the ideal FIR output for a period of time. This vector can be centered around the current time, which is k, and can go in both directions in time, including both the future ideal FIR output values and the past ideal FIR output values. Here, the superscript "d" indicates that this is the ideal FIR output (the reconstructed FIR output, which is the signal after some signal processing and reconstruction).

Figure 3:
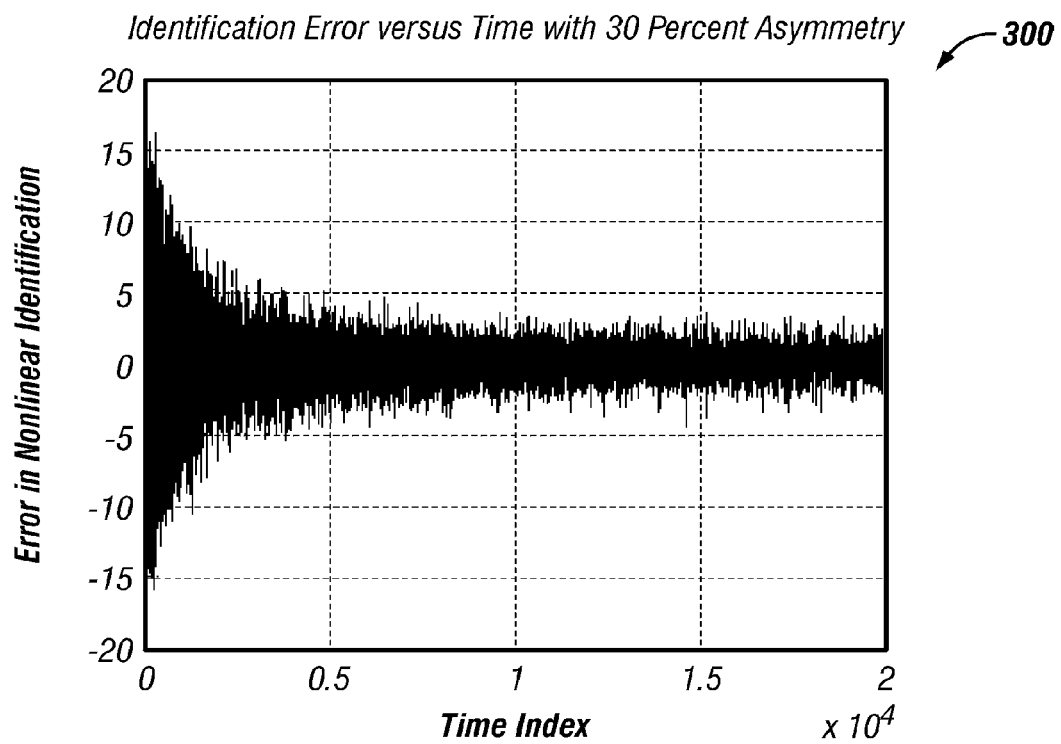
FIG. 3 is a graph illustrating an example of error over time during a simulation of a matrix approach to modeling asymmetry in a channel.

A Minimum Mean Square Error (MMSE) criterion can be used to decide the matrices in the above modeling. Simulations of this modeling indicate high accuracy. For example, with a DC-free target of [5, 3, −3, −3, −2], 30% asymmetry, 1×25 and 25×25 modeling matrices, the simulated identification error, defined as the difference between the real FIR output $Y_r(k)$ and the identified FIR output $Y_a(k)$, is shown in a graph 300 in FIG. 3. As shown, the error can be very small once the converged values of the $\Gamma$ and $\Lambda$ matrices are obtained, and the nonlinearity is accurately summarized by the second term of equation (1), $\hat{Y}_k^T \cdot \Lambda \cdot \hat{Y}_k$, which is governed by the $\Lambda$ matrix. Most of the information regarding the MR asymmetry will typically be provided by the $\Lambda$ matrix.

The asymmetry nonlinearity is modeled in a 25×25 matrix. To do asymmetry correction, a subset of the six hundred and twenty five (25 times 25) matrix elements can be used as indicators of the amount and direction of MR asymmetry identified in the matrix. Moreover, a set of such indicators can be selected for use with multiple target polynomials by examining the matrices in some specific cases.

Table 1 shows a portion of a converged, asymmetry matrix generated for a target of [5, 3, −3, −3, −2], with 30% asymmetry; the portion shown is the core 13×13 matrix of the nonlinear modeling (the most significant information is found in the center of the 25×25 matrix, thus only the core 13×13 matrix within the 25×25 matrix is shown here):

TABLE 1

| | C1<br>k − 6 | C2<br>k − 5 | C3<br>k − 4 | C4<br>k − 3 | C5<br>k − 2 | C6<br>k − 1 | C7<br>k | C8<br>k + 1 | C9<br>k + 2 | C10<br>k + 3 | C11<br>k + 4 | C12<br>k + 5 | C13<br>k + 6 |
|---|---|---|---|---|---|---|---|---|---|---|---|---|---|
| R1<br>k − 6 | 0.06 | 0.03 | −0.14 | 0.04 | 0.08 | −0.27 | −0.13 | 0.03 | −0.02 | 0.01 | −0.03 | 0.07 | −0.04 |
| R2<br>k − 5 | 0.03 | −0.22 | 0.30 | −0.17 | −0.06 | 0.27 | −0.38 | −0.04 | 0.02 | 0.06 | 0.02 | −0.01 | 0.01 |
| R3<br>k − 4 | −0.14 | 0.30 | −0.31 | 0.36 | 0.10 | 0.51 | 0.02 | −0.18 | 0.15 | −0.19 | 0.09 | −0.11 | 0.06 |
| R4<br>k − 3 | 0.04 | −0.17 | 0.36 | −0.51 | 0.07 | 0.32 | 0.72 | −0.11 | −0.04 | 0.11 | −0.02 | 0.08 | −0.05 |
| R5<br>k − 2 | 0.08 | −0.06 | 0.10 | 0.01 | 0.07 | −0.38 | 0.05 | 0.33 | −0.18 | 0.10 | −0.16 | 0.07 | −0.10 |
| R6<br>k − 1 | −0.27 | 0.27 | −0.51 | 0.32 | −0.38 | 0.36 | −0.48 | −0.64 | 0.60 | −0.31 | 0.40 | −0.23 | 0.28 |
| R7<br>k | −0.13 | −0.39 | 0.02 | −0.72 | 0.05 | −0.48 | −0.32 | 0.44 | −0.06 | 0.47 | 0.09 | 0.39 | 0.09 |

TABLE 1-continued

| | | | | | | | | | | | | | |
|---|---|---|---|---|---|---|---|---|---|---|---|---|---|
| R8 k + 1 | 0.03 | -0.04 | -0.18 | -0.11 | 0.33 | -0.64 | 0.44 | 0.54 | 0.10 | 0.33 | -0.06 | 0.19 | -0.09 |
| R9 k + 2 | -0.02 | 0.02 | 0.15 | -0.04 | -0.18 | 0.60 | -0.06 | 0.10 | 0.21 | -0.23 | 0.07 | -0.15 | 0.04 |
| R10 k + 3 | 0.01 | 0.06 | -0.19 | 0.11 | 0.10 | -0.31 | 0.47 | 0.33 | -0.23 | -0.02 | 0.01 | 0.06 | 0.01 |
| R11 k + 4 | -0.03 | 0.02 | 0.9 | -0.02 | -0.16 | 0.40 | 0.09 | -0.06 | 0.07 | 0.01 | 0.11 | -0.11 | 0.01 |
| R12 k + 5 | 0.07 | -0.07 | -0.11 | 0.08 | 0.07 | -0.23 | 0.39 | 0.19 | -0.15 | 0.06 | -0.11 | 0.03 | -0.02 |
| R13 k + 6 | -0.04 | 0.01 | 0.06 | -0.05 | -0.10 | 0.28 | 0.09 | -0.09 | 0.04 | 0.01 | 0.01 | -0.02 | 0.06 |

The elements of this matrix reflect the nonlinearity of the signal. Most of the elements are very close to zero. However, many of the elements near the center of the matrix and around the main diagonal have large values and can be good indicators of nonlinearity in the signal and also of the direction of that nonlinearity. By looking at multiple matrices generated for different targets, a set of matrix elements can be selected and used as good indicators of asymmetry in the signal. The target polynomial selected for a given channel is generally independent of asymmetry in that channel and is mostly a function of the channel density and signal to noise ratio. Using the systems and techniques described, a read channel transceiver device can be designed for use with multiple different target polynomials and in multiple different applications.

Table 2 shows the core portion (the core 13×13 matrix of the nonlinear modeling) of a converged, asymmetry matrix generated for a target of [4, 3, −2, −3, −2], with 30% asymmetry:

TABLE 2

| | C1 k - 6 | C2 k - 5 | C3 k - 4 | C4 k - 3 | C5 k - 2 | C6 k - 1 | C7 k | C8 k + 1 | C9 k + 2 | C10 k + 3 | C11 k + 4 | C12 k + 5 | C13 k + 6 |
|---|---|---|---|---|---|---|---|---|---|---|---|---|---|
| R1 k - 6 | 0.08 | 0.05 | -0.07 | -0.03 | 0.10 | -0.19 | -0.32 | -0.03 | 0.06 | -0.02 | -0.02 | 0.02 | -0.01 |
| R2 k - 5 | 0.05 | -0.16 | 0.24 | -0.05 | -0.05 | 0.14 | -0.29 | -0.06 | -0.02 | 0.06 | 0.02 | -0.00 | 0.01 |
| R3 k - 4 | -0.07 | 0.24 | -0.28 | 0.30 | 0.15 | -0.34 | -0.15 | -0.17 | 0.21 | -0.17 | 0.04 | -0.06 | 0.01 |
| R4 k - 3 | -0.03 | -0.05 | 0.30 | -0.41 | -0.05 | 0.11 | -0.67 | -0.28 | -0.03 | 0.08 | 0.07 | 0.05 | 0.01 |
| R5 k - 2 | 0.10 | -0.05 | 0.15 | -0.05 | 0.09 | -0.35 | -0.17 | 0.36 | -0.14 | 0.02 | -0.16 | 0.03 | -0.11 |
| R6 k - 1 | -0.19 | 0.14 | -0.34 | 0.11 | -0.35 | 0.39 | 0.36 | -0.55 | 0.49 | -0.12 | 0.28 | -0.07 | 0.19 |
| R7 k | -0.32 | -0.29 | -0.15 | -0.67 | -0.17 | -0.36 | -0.38 | 0.29 | 0.24 | 0.38 | 0.26 | 0.35 | 0.27 |
| R8 k + 1 | -0.03 | -0.06 | -0.17 | -0.28 | 0.36 | -0.55 | 0.29 | 0.62 | 0.06 | 0.30 | -0.03 | 0.20 | -0.06 |
| R9 k + 2 | 0.06 | -0.02 | 0.21 | -0.03 | -0.14 | 0.49 | 0.24 | 0.06 | 0.18 | -0.09 | -0.09 | -0.10 | -0.04 |
| R10 k + 3 | -0.02 | 0.06 | -0.17 | 0.08 | 0.02 | -0.12 | 0.38 | 0.30 | -0.09 | -0.14 | 0.03 | 0.03 | 0.02 |
| R11 k + 4 | -0.02 | 0.02 | 0.04 | 0.01 | -0.16 | 0.28 | 0.26 | -0.03 | -0.09 | 0.03 | 0.10 | -0.11 | 0.00 |
| R12 k + 5 | 0.02 | -0.00 | -0.06 | 0.05 | 0.03 | -0.07 | 0.35 | 0.20 | -0.10 | 0.03 | -0.11 | -0.05 | 0.00 |
| R13 k + 6 | -0.01 | 0.01 | 0.01 | 0.01 | -0.11 | 0.19 | 0.27 | -0.06 | -0.04 | 0.02 | 0.00 | 0.00 | 0.01 |

Table 3 shows the core portion (the core 13×13 matrix of the nonlinear modeling) of a converged, asymmetry matrix generated for a target of [7, 4, −4, −5, −2], with 30% asymmetry:

of the multiple matrices can be identified. For example, in the three cases shown above, the shaded matrix elements can be selected for use in controlling asymmetry correction in the channel:

TABLE 3

|   | C1<br>k−6 | C2<br>k−5 | C3<br>k−4 | C4<br>k−3 | C5<br>k−2 | C6<br>k−1 | C7<br>k | C8<br>k+1 | C9<br>k+2 | C10<br>k+3 | C11<br>k+4 | C12<br>k+5 | C13<br>k+6 |
|---|---|---|---|---|---|---|---|---|---|---|---|---|---|
| R1<br>k−6 | 0.22 | −0.01 | −0.37 | 0.51 | −0.08 | −0.30 | 0.05 | 0.03 | −0.02 | −0.02 | 0.03 | −0.03 | −0.01 |
| R2<br>k−5 | −0.01 | −0.41 | 0.86 | −1.03 | 0.20 | 0.29 | −0.28 | −0.17 | 0.04 | 0.04 | 0.01 | 0.01 | 0.01 |
| R3<br>k−4 | −0.37 | 0.86 | −1.43 | 1.46 | −0.46 | −0.69 | 0.28 | 0.13 | −0.07 | −0.04 | 0.02 | −0.02 | −0.02 |
| R4<br>k−3 | 0.51 | −1.03 | 1.46 | −1.32 | 0.24 | 0.95 | −0.90 | −0.39 | 0.11 | −0.01 | 0.02 | −0.00 | 0.03 |
| R5<br>k−2 | −0.08 | 0.20 | −0.46 | 0.24 | 0.48 | −1.59 | 1.11 | 0.41 | −0.20 | 0.03 | 0.00 | 0.02 | 0.00 |
| R6<br>k−1 | −0.30 | 0.29 | −0.69 | 0.95 | −1.59 | 1.75 | −1.39 | −0.46 | 0.39 | 0.07 | 0.13 | 0.02 | 0.10 |
| R7<br>k | 0.05 | −0.28 | 0.28 | −0.90 | 1.11 | −1.39 | 0.76 | 0.45 | −0.24 | 0.02 | 0.04 | 0.09 | 0.06 |
| R8<br>k+1 | 0.03 | −0.17 | 0.13 | −0.39 | 0.41 | −0.46 | 0.45 | −0.18 | 0.44 | 0.29 | 0.15 | 0.07 | 0.08 |
| R9<br>k+2 | −0.02 | 0.04 | −0.07 | 0.11 | −0.20 | 0.39 | −0.24 | 0.44 | −0.05 | −0.18 | −0.04 | −0.04 | −0.01 |
| R10<br>k+3 | −0.02 | 0.04 | −0.04 | −0.07 | 0.03 | 0.07 | 0.02 | 0.29 | −0.18 | 0.07 | 0.06 | 0.04 | 0.03 |
| R11<br>k+4 | 0.03 | 0.01 | 0.02 | 0.02 | 0.00 | 0.13 | 0.04 | 0.15 | −0.04 | 0.06 | 0.04 | 0.06 | −0.03 |
| R12<br>k+5 | −0.03 | 0.01 | −0.02 | −0.00 | 0.02 | 0.02 | 0.09 | 0.07 | −0.04 | 0.04 | −0.06 | −0.02 | 0.01 |
| R13<br>k+6 | −0.07 | 0.07 | −0.02 | 0.03 | 0.00 | 0.10 | 0.06 | 0.08 | −0.01 | 0.03 | −0.03 | 0.01 | 0.04 |

The matrices given in Tables 1, 2 and 3 are symmetrical about the main diagonal [(R1,C1), (R2,C2), ... , (R12,C12), (R13,C13)]. The center element in each matrix (R7,C7), which is at the intersection of the 7th column (C7) and 7th row (R7), corresponds to the current time index "k". Each element in these matrices represents the relationship between the real FIR output and a certain product of the ideal FIR output.

The center element (R7,C7) corresponds to the square of the current FIR output ($y_k^d \cdot y_k^d$). The remaining elements on the main diagonal correspond to the squares of the past and future FIR outputs ($y_{k-6}^d \cdot y_{k-6}^d$, ... , $y_{k-1}^d \cdot y_{k-1}^d$, $y_{k+1}^d \cdot y_{k+1}^d$, ... , $y_{k+6}^d \cdot y_{k+6}^d$). The elements off the main diagonal correspond to products of the FIR output at different discrete times (product terms having different time index subscripts). Thus, the element (R8,C7) corresponds to the product $y_k^d \cdot y_{k+1}^d$.

By examining multiple matrices, such as above, matrix elements that are significant in the nonlinear modeling in each

TABLE 4

| Matrix Elements | Nonlinear Modeling Terms |
|---|---|
| element (R3, C6) | → $y_{k-1}^d \cdot y_{k-4}^d$ |
| element (R4, C7) | → $y_k^d \cdot y_{k-3}^d$ |
| element (R5, C6) | → $y_{k-1}^d \cdot y_{k-2}^d$ |
| element (R6, C7) | → $y_k^d \cdot y_{k-1}^d$ |
| element (R7, C8) | → $y_{k+1}^d \cdot y_k^d$ |
| element (R6, C8) | → $y_{k+1}^d \cdot y_{k+1}^d$ |
| element (R5, C8) | → $y_{k+1}^d \cdot y_{k-2}^d$ |
| element (R6, C9) | → $y_{k+2}^d \cdot y_{k-1}^d$ |

Table 4 shows example matrix elements, and their corresponding nonlinear modeling terms (from equations (1) and (2) above), which are useful in controlling asymmetry correction.

In addition, such matrix elements flip their signs when the asymmetry is switched to an opposite polarity. Thus, the nonlinear modeling terms obtained using this matrix approach can be used as indicators of the presence of asymmetry and its polarity. When asymmetry correction is applied, such individual terms or their combination can be used as a guideline to show if the current asymmetry correction is adequate, in which direction the correction should be adjusted, or both.

Figure 4:
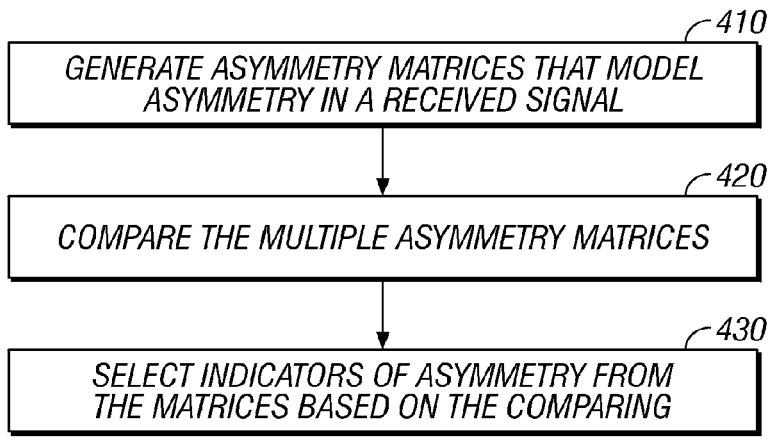
FIG. 4 is a flowchart illustrating a process of selecting signal indicators of asymmetry for use in asymmetry correction.

FIG. 4 is a flowchart illustrating a process of selecting signal indicators of asymmetry for use in asymmetry correction. Multiple asymmetry matrices that model asymmetry in a received analog signal, including an effect of asymmetry spreading in a read channel, are generated at 410. This can involve generating asymmetry matrices that characterize relationships between true FIR output and reconstructed, ideal FIR output for different targets, including a DC target and a DC-free target, as described further below.

The multiple asymmetry matrices are compared at 420. This can involve determining one or more matrix elements that have significant correlation with the asymmetry across the multiple matrices, where the one or more matrix elements are off a main matrix diagonal. The criteria used in choosing the indicators can have three main aspects: (1) the indicator should have consistent signs in the sense that the indicator, as defined by an element at a particular position in the matrix, does not change sign across different matrices generated by different target channels as long as the polarity of the asymmetry applied is not also changed; (2) the values of the indicators should be significant compared to the remaining matrix elements (e.g., the value of an indicator should be no less than 10% of the maximum element values of the matrix regardless of the target channels); and (3) the value of an indicator should be, in general, linearly proportional to the amount of asymmetry applied prior to any asymmetry correction.

Indicators of asymmetry are selected from the matrices based on the comparison at 430. This can involve deciding which indicators to include in a read channel device being designed, or this can involve assigning relative contributions of the indicators for use in asymmetry correction in a read channel device that has been designed to include multiple programmable asymmetry indicators in accordance with the present specification.

Thus, in general, one or more asymmetry indicators can be derived by finding common indicators of nonlinearity in a signal across different target polynomials. A single such indicator may be used to control asymmetry correction or multiple such indicators may be used. In addition, many indicators may be selected for use in a device (e.g., a read channel transceiver device), and the device can include program functionality allowing reduction of the influence of one or more of the selected indicators (including potentially turning off one or more of the indicators). Thus, the indicators used in a given application can be programmed as desired.

For example, two indicators can be used as a reliable indication of asymmetry and the remaining indicators can be ignored. Thus, the nonlinear identification can be modeled by the following asymmetry polynomial:

$$y_k^a = \alpha \cdot y_k^d + \beta \cdot y_k^d \cdot (y_{k+1}^d - y_{k-1}^d) \tag{3}$$

where $y^d$ is the ideal channel output, $y^a$ is the real output according to the asymmetry model, $\alpha$ models the gain factor of the equalized channel, and $\beta$ indicates the presence of asymmetry. Using this model, the coefficients of the asymmetry polynomial ($\alpha$ and $\beta$) can be determined and used to adjust the asymmetry correction.

The coefficients $\alpha$ and $\beta$ can be adaptively decided using the LMS control circuit 245. An error signal is defined according to the following equation:

$$e_k = y_k^r - y_k^a \tag{4}$$

where $y^r$ is the real FIR output with MR asymmetry included and $y^a$ is the modeled/identified FIR output with the nonlinearity taken into account in the modeling, from equation (3). The model of nonlinearity in the readback signal can thus be made more accurate by making $y^a$ as close to $y^r$ as possible. With this error signal defined, the coefficients of the nonlinearity model (and consequently the coefficients used by the ASC) can be adjusted using least mean squared error criteria based on the products corresponding to the selected matrix indicators.

Thus, $\alpha$ and $\beta$ can be determined by the following equations:

$$\alpha_{k+1} = \alpha_k + \mu_a \cdot e_k \cdot y_k^d \tag{5}$$

$$\beta_{k+1} = \beta_k + \mu_b e_k y_k^d \cdot (y_{k+1}^d - y_{k-1}^d) \tag{6}$$

using the LMS control circuit 245. Once the values of $\alpha$ and $\beta$ are reliably determined, the adaptation of the asymmetry correction coefficient can be given by:

$$q_{k+1} = q_k + \mu \cdot \beta \tag{7}$$

where q is the asymmetry correction coefficient, and $\mu$ is a step size in the adjustment of the coefficient. As $\beta$ goes to zero, the asymmetry is thereby reduced or removed. Note that $\mu$ may be a programmable parameter in a system, as described further below, or $\mu$ may be an implicit parameter and not expressly defined.

The example matrices shown above are for the case of using a DC-free target with a possible differentiator used with the CTF. In practice, a DC target can also be used. In the case of a DC target, the characteristics of the matrices modeling the asymmetry will be different. An example is shown in Table 5.

Table 5 shows the core portion (the core 13×13 matrix of the nonlinear modeling) of a converged, asymmetry matrix generated for a DC target of [5, 6, 0, −1], with 30% asymmetry:

TABLE 5

| | C1<br>k − 6 | C2<br>k − 5 | C3<br>k − 4 | C4<br>k − 3 | C5<br>k − 2 | C6<br>k − 1 | C7<br>k | C8<br>k + 1 | C9<br>k + 2 | C10<br>k + 3 | C11<br>k + 4 | C12<br>k + 5 | C13<br>k + 6 |
|---|---|---|---|---|---|---|---|---|---|---|---|---|---|
| R1<br>k − 6 | 0.01 | 0.00 | 0.01 | 0.01 | −0.00 | −0.01 | 0.02 | 0.03 | 0.00 | −0.00 | −0.00 | 0.00 | −0.01 |
| R2<br>k − 5 | 0.00 | −0.01 | −0.01 | −0.03 | 0.01 | 0.01 | −0.03 | −0.03 | −0.01 | 0.00 | −0.00 | 0.00 | 0.00 |
| R3<br>k − 4 | 0.01 | −0.01 | 0.04 | 0.00 | 0.06 | 0.02 | −0.01 | 0.02 | −0.00 | 0.00 | −0.00 | −0.00 | −0.00 |
| R4<br>k − 3 | 0.01 | −0.03 | 0.00 | −0.12 | 0.04 | 0.03 | −0.08 | −0.04 | −0.00 | −0.00 | −0.01 | 0.01 | −0.00 |
| R5<br>k − 2 | −0.00 | 0.01 | 0.06 | 0.04 | 0.38 | 0.11 | −0.20 | −0.06 | −0.01 | 0.01 | −0.00 | −0.00 | −0.00 |
| R6<br>k − 1 | −0.01 | 0.01 | 0.02 | 0.03 | 0.11 | −0.10 | −0.43 | −0.13 | 0.02 | −0.03 | 0.02 | −0.02 | 0.02 |
| R7<br>k | 0.02 | −0.03 | −0.01 | −0.08 | −0.20 | −0.43 | −1.20 | −0.46 | 0.03 | −0.06 | 0.04 | −0.04 | 0.03 |

TABLE 5-continued

| | C1<br>k−6 | C2<br>k−5 | C3<br>k−4 | C4<br>k−3 | C5<br>k−2 | C6<br>k−1 | C7<br>k | C8<br>k+1 | C9<br>k+2 | C10<br>k+3 | C11<br>k+4 | C12<br>k+5 | C13<br>k+6 |
|---|---|---|---|---|---|---|---|---|---|---|---|---|---|
| R8 k+1 | 0.03 | −0.03 | 0.02 | −0.04 | −0.06 | −0.13 | −0.46 | 0.07 | 0.13 | −0.01 | 0.02 | −0.01 | 0.01 |
| R9 k+2 | 0.00 | −0.01 | −0.00 | −0.00 | −0.01 | 0.02 | 0.03 | 0.13 | 0.15 | 0.01 | −0.01 | 0.01 | −0.01 |
| R10 k+3 | −0.00 | 0.00 | 0.00 | −0.00 | 0.01 | −0.03 | −0.06 | −0.01 | 0.01 | −0.10 | −0.01 | 0.01 | −0.01 |
| R11 k+4 | −0.00 | −0.00 | −0.00 | −0.01 | −0.00 | 0.02 | 0.04 | 0.02 | −0.01 | −0.01 | 0.06 | 0.01 | −0.00 |
| R12 k+5 | 0.00 | 0.00 | −0.00 | 0.01 | −0.00 | −0.02 | −0.04 | −0.01 | 0.01 | 0.01 | 0.01 | −0.04 | −0.00 |
| R13 k+6 | −0.01 | 0.00 | −0.00 | −0.00 | −0.00 | 0.02 | 0.03 | 0.01 | −0.01 | −0.01 | −0.00 | −0.00 | 0.02 |

In this matrix, the most significant term is the center element (R7,C7). In comparison, the other elements are relatively small. Thus, in the case of DC targets, the squared ideal equalized output value for the current time should usually be included in the nonlinear modeling. Thus, this matrix element can be included in the modeling, such as in the following example equations:

$$y_k^a = \alpha \cdot y_k^d + \beta \cdot y_k^d \cdot (y_{k+1}^d - y_{k-1}^d) + \chi \cdot y_k^d \cdot y_k^d \quad (8)$$

$$\chi_{k+1} = \chi_k + \mu_c \cdot e_k \cdot y_k^d \cdot y_k^d \quad (9)$$

χ indicates the presence of asymmetry based on the squared term of the matrix center and can be adaptively decided using the LMS control circuit 245. Adaptation of an asymmetry correction coefficient can also be influenced by this squared term, such as in:

$$q_{k+1} = q_k + \mu \cdot (\beta - \chi) \quad (10)$$

Alternatively, χ and β can be split up and used with programmable step sizes, as in:

$$q_{k+1} = q_k + \mu_1 \beta - \mu_2 \chi \quad (11)$$

The programmable values $\mu_1$ and $\mu_2$ provide programmable control over the influence of various asymmetry indicators in the asymmetry correction, including potentially turning off an indicator all together. For example, as shown in FIG. 2, the LMS control circuit 245 can include a programming interface 247 with inputs for $\mu_1$ and $\mu_2$ that enable program control over relative contributions of the asymmetry indicators, $(y_k^d \cdot y_{k+1}^d - y_k^d \cdot y_{k-1}^d)$ and $(y_k^d \cdot y_k^d)$.

Moreover, multiple programmable values $(\mu_1 \ldots \mu_N)$ can be used with multiple asymmetry indicators, which can be grouped in various ways. In the example above, indicators (R6,C7) and (R7,C8) are grouped with β and the indicator (R7,C7) stands alone with χ. However, more or fewer indicators can be used, and these indicators can be grouped in various ways to provide program control over the asymmetry correction.

This technique can determine the nonlinearity at the FIR output and can be directly applied to the adjustment of the coefficients in the ASC. The asymmetry correction can be applied in the analog, continuous time domain (e.g., as close to the asymmetry component 205 as possible).

Figures 5, 7:
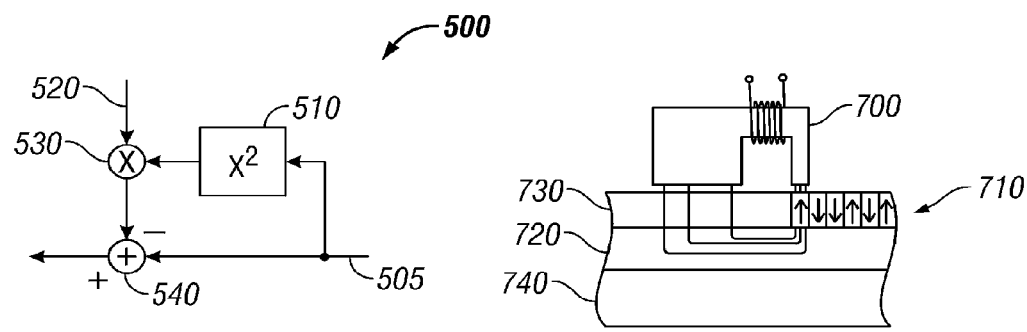
FIG. 5 is a block diagram illustrating an example asymmetry correction circuit (ASC).
FIG. 7 is a block diagram showing perpendicular magnetic recording as can be used in the magnetic-media disk drive of FIG. 6.

FIG. 5 is a block diagram illustrating an example ASC 500. The ASC 500 is implemented in an analog circuit in the continuous time domain. The ASC 500 adjusts the readback signal 505 by feeding it through a squaring circuit 510 and a multiplier circuit 530 to obtain an adjusted signal that is then added back into the readback signal 505. The squaring circuit 510 squares the signal 505, the multiplier circuit 530 mixes the squared signal with a second order coefficient value 520, and the result is combined with the readback signal 505 in an adder circuit 540. Additional higher order adjustments can also be built into the ASC 500.

Figure 6:
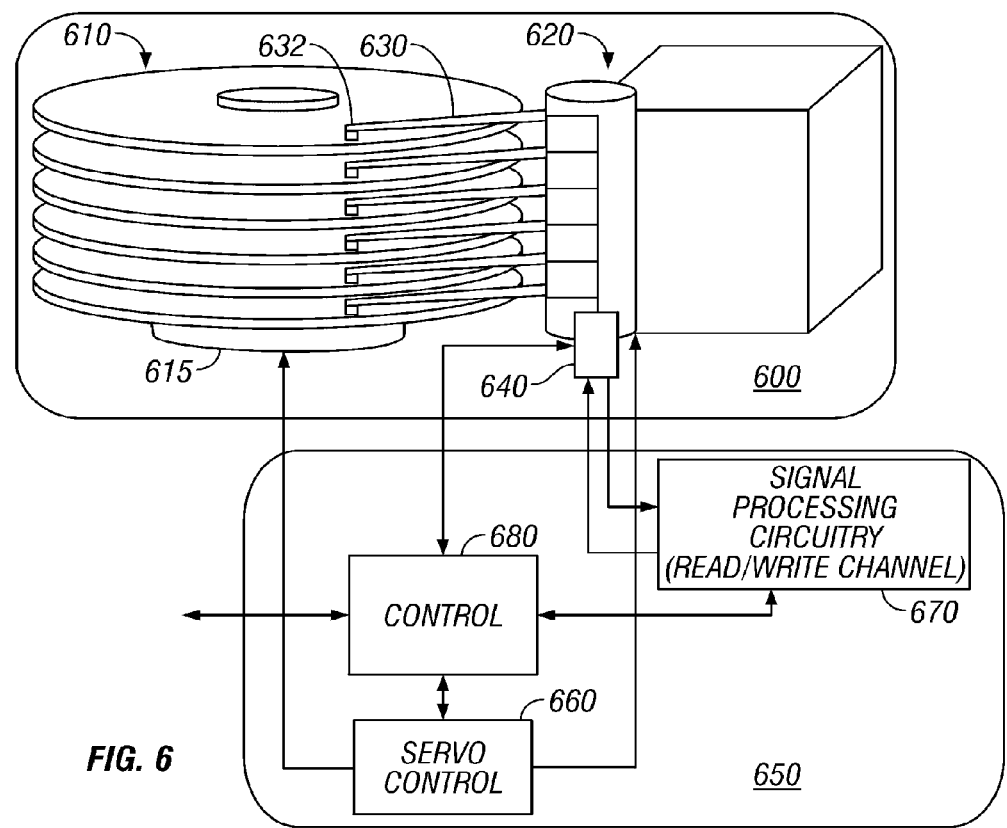
FIG. 6 is a block diagram showing a magnetic-media disk drive that employs amplitude asymmetry correction as described.

The signal processor components described can be implemented as one or more devices, such as one or more integrated circuit (IC) devices, in a storage device. FIG. 6 is a block diagram showing a magnetic-media disk drive that employs amplitude asymmetry correction as described. The disk drive includes a head-disk assembly (HDA) 600 and drive electronics 650 (e.g., a printed circuit board assembly (PCBA) with semiconductor devices). The HDA 600 includes one or more disks 610 mounted on an integrated spindle and motor assembly 615. The spindle and motor assembly 615 rotates the disk(s) 610 under read-write head(s) connected with a head assembly 620 in the HDA 600. The disk(s) 610 can be coated with a magnetically hard material (e.g., a particulate surface or a thin-film surface) and can be written to, or read from, a single side or both sides of each disk.

A head 632 on an arm 630 can be positioned as needed to read data on the disk. A motor, such as a voice coil motor, can be used to position the head over a desired track. The arm 630 can be a pivoting or sliding arm and can be spring-loaded to maintain a proper flying height for the head 632 in any drive orientation. A closed-loop head positioning system can be used.

The HDA 600 can include a preamp/writer 640, where head selection and sense current value(s) can be set. The preamp/writer 640 can amplify a readback signal before outputting it to signal processing circuitry 670. The signal processing circuitry 670 can include a readback signal circuit, a servo signal processing circuit, and a write signal circuit.

Signals between the HDA 600 and the drive electronics 650 can be carried through a flexible printed cable. A controller 680 can direct a servo controller 660 to control mechanical operations, such as head positioning through the head assembly 620 and rotational speed control through the motor assembly 615. The controller 680 can be one or more IC chips (e.g., a combo chip), which can include read/write channel signal processing circuitry 670. The controller 680 can be a microprocessor and a hard disk controller. The drive electronics 650 can also include various interfaces, such as a host-bus interface, and memory devices, such as a read only memory (ROM) for use by a microprocessor, and a random access memory (RAM) for use by a hard disk controller. The read/write channel 670 can also include error correction circuitry (e.g., MNP).

The amplitude asymmetry correction circuitry can be integrated with one or more of the components described above or organized into a separate component of a disk drive. For example, the amplitude asymmetry correction circuitry can be integrated into the controllers 660, 680, the read/write channel 670, the preamp/writer 640, or various combinations of these components (e.g., the components 660, 670, 680 can all be combined into a single integrated circuit). Moreover, the amplitude asymmetry correction circuitry can be integrated into a device, such as a read/write channel transceiver device (e.g., the read/write channel 670), suitable for use in a magnetic recording system; and this device can be configured to be usable with both longitudinal magnetic recording (LMR) and perpendicular magnetic recording (PMR).

FIG. 7 is a block diagram showing PMR as can be used in the magnetic-media disk drive of FIG. 6. A read-write head 700 flies over a PMR storage disk 710. The head 700 records bits perpendicular to the plane of the disk. The PMR disk 710 includes a high permeability ("soft") magnetic under-layer 720 between a perpendicularly magnetized thin film data storage layer 730 and the substrate 740. An image of the magnetic head pole created by the head 700 is produced in the magnetically soft under-layer 720. Consequently, the storage layer 730 is effectively in the gap of the recording head, where the magnetic recording field is larger than the fringing field produced by a LMR head. A read/write channel transceiver device designed for use with both PMR and LMR can include a differentiator to take the first derivative of the readback signal in the case PMR, as described above.

Figure 8:
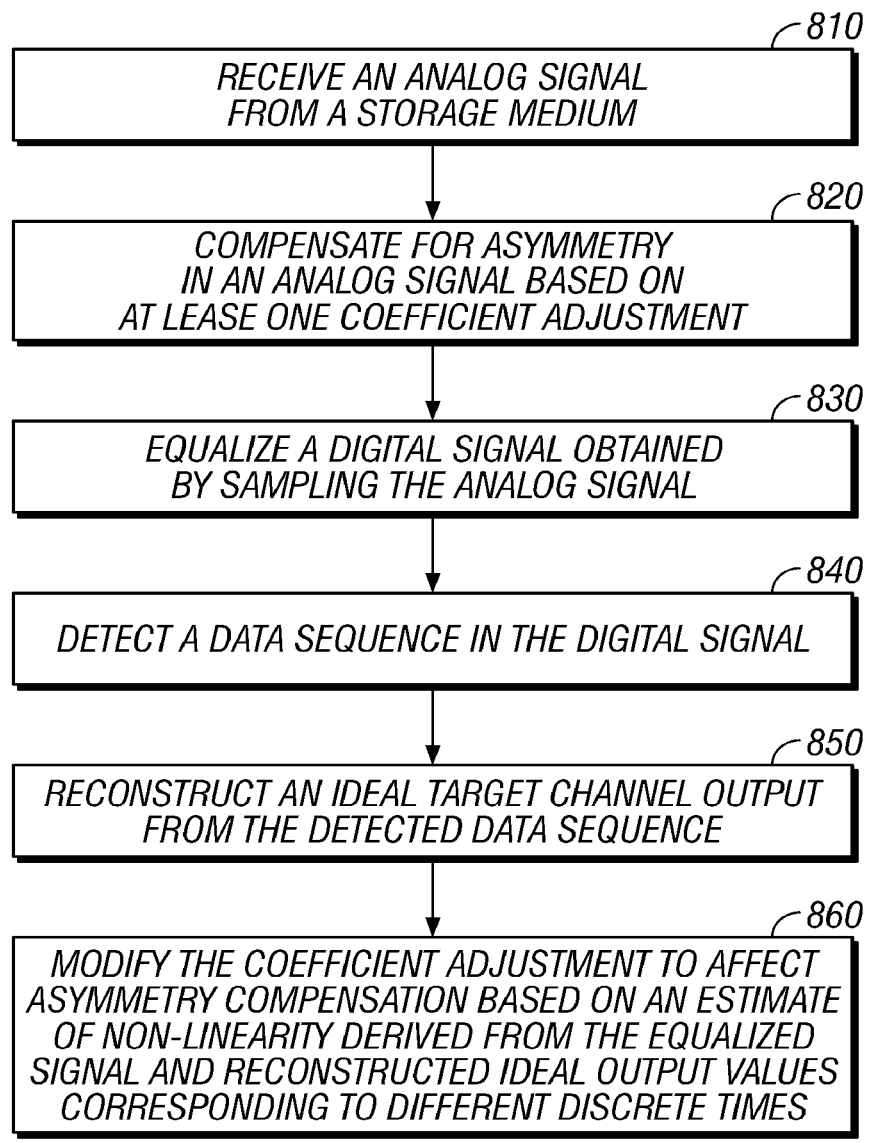
FIG. 8 is a flowchart illustrating a process of asymmetry correction as can be performed in a storage system.

FIG. 8 is a flowchart illustrating a process of asymmetry correction as can be performed in a storage system. An analog signal is received from a storage medium at 810. Asymmetry in the analog signal is compensating for based on at least one coefficient adjustment at 820.

A digital signal obtained by sampling the analog signal is equalized at 830. A data sequence is detected in the digital signal at 840. An ideal target channel output is reconstructed from the detected data sequence at 850. The coefficient adjustment is modified to affect the asymmetry compensation based on an estimate of nonlinearity derived from the digital equalized signal and reconstructed ideal target channel output values corresponding to different discrete times at 860.

The processes described above, and all of the functional operations described in this specification, can be implemented in electronic circuitry, computer hardware, firmware, software, or in combinations of them, such as the structural means disclosed in this specification and structural equivalents thereof, including a software program operable to cause one or more machines to perform the operations described. It will be appreciated that the order of operations presented is shown only for the purpose of clarity in this description. No particular order may be required for these operations, and various operations can occur simultaneously.

A few embodiments have been described in detail above, and various modifications are possible. Thus, other embodiments may be within the scope of the following claims.

What is claimed is:

1. An apparatus comprising:
an asymmetry correction circuit configured to receive an analog signal and to compensate for asymmetry in the received analog signal;
a signal equalizer configured to receive an input signal responsive to an output of the asymmetry correction circuit and to generate an equalized signal;
a discrete time sequence detector operable to examine the equalized signal; and
a control circuit operable to provide a coefficient adjustment to the asymmetry correction circuit to affect asymmetry compensation based on an estimate of nonlinearity derived from the equalized signal and multiple reconstructed ideal channel output values, wherein the reconstructed ideal channel output values are derived from an output of the discrete time sequence detector and correspond to at least two different discrete times.

2. The apparatus of claim 1, wherein the coefficient adjustment comprises one or more values received by the asymmetry correction circuit to control the asymmetry compensation, the one or more values being generated at least in part according to an equation, $q_{k+1}=q_k+\mu_1\beta-\mu_2\chi$, where $q_k$ is an asymmetry correction coefficient at time k, $\mu_1$ and $\mu_2$ are programmable step sizes, $\beta_{k+1}=\beta_k+\mu_b\cdot(y_k^r-y_k^a)\cdot y_k^d\cdot(y_{k+1}^d-y_{k-1}^d)$, $\chi_{k+1}=\chi_k+\mu_c(y_k^r-y_k^a)\cdot y_k^d\cdot y_k^d$, $\mu_b$ and $\mu_c$ are step sizes, $y^r$ corresponds to the equalized signal, $y^d$ corresponds to an estimated ideal channel output derived from the output of the discrete time sequence detector, and $y^a$ corresponds to an estimated real equalized channel output with asymmetry taken into account.

3. The apparatus of claim 1, further comprising:
a continuous time filter (CTF) responsive to the output of the asymmetry correction circuit; and
an analog to digital converter (ADC) responsive to an output of the continuous time filter, wherein the signal equalizer comprises a finite impulse response (FIR) digital filter, an input signal of the FIR digital filter being responsive to an output of the ADC.

4. The apparatus of claim 1, wherein the asymmetry correction circuit, the signal equalizer, the discrete time sequence detector and the control circuit comprise at least a portion of a read channel in a magnetic storage access device.

5. The apparatus of claim 1, wherein the analog signal comprises a readback signal obtained from a storage medium using perpendicular magnetic recording.

6. The apparatus of claim 1, wherein the control circuit is configured to derive the estimate of nonlinearity from the equalized signal and multiple asymmetry indicators, wherein each asymmetry indicator is based on one or more of the reconstructed ideal channel output values.

7. The apparatus of claim 6, wherein the asymmetry indicators are selected based on a comparison of multiple, converged, asymmetry matrices generated for different targets for modeling signal nonlinearity caused by magnetic recording channel asymmetry.

8. The apparatus of claim 7, wherein the different targets include a DC target and a DC-free target.

9. The apparatus of claim 6, wherein the asymmetry indicators include a common-time indicator and a separated-time indicator, the common-time indicator comprising a square of a given reconstructed ideal channel output value, and the separated-time indicator comprising a product of two given reconstructed ideal channel output values corresponding to different discrete times.

10. A system comprising:
a read channel to produce an analog signal;
an asymmetry correction circuit configured to receive the analog signal and to compensate for asymmetry in the received analog signal;
a signal equalizer configured to receive an input signal responsive to an output of the asymmetry correction circuit and to generate an equalized signal;
a discrete time sequence detector operable to examine the equalized signal; and
a control circuit operable to provide a coefficient adjustment to the asymmetry correction circuit to affect asymmetry compensation based on an estimate of nonlinearity derived from the equalized signal and multiple reconstructed ideal channel output values, wherein the reconstructed ideal channel output values are derived from an output of the discrete time sequence detector and correspond to at least two different discrete times.

11. The system of claim 10, wherein the coefficient adjustment comprises one or more values received by the asymmetry correction circuit to control the asymmetry compensation, the one or more values being generated at least in part according to an equation, $q_{k+1}=q_k+\mu_1\beta-\mu_2\chi$, where $q_k$ is an asymmetry correction coefficient at time k, $\mu_1$ and $\mu_2$ are programmable step sizes, $\beta_{k+1}=\beta_k+\mu_b(y_k^r-y_k^a)\cdot y_k^d\cdot(y_{k+1}^d-y_{k-1}^d)$, $\chi_{k+1}=\chi_k+\mu_c\cdot(y_k^r-y_k^a)\cdot y_k^d\cdot y_k^d$, $\mu_b$ and $\mu_c$ are step sizes, $y^r$ corresponds to the equalized signal, $y^d$ corresponds to an estimated ideal channel output derived from the output of the discrete time sequence detector, and $y^a$ corresponds to an estimated real equalized channel output with asymmetry taken into account.

12. The system of claim 10, further comprising:
a continuous time filter (CTF) responsive to the output of the asymmetry correction circuit; and
an analog to digital converter (ADC) responsive to an output of the continuous time filter, wherein the signal equalizer comprises a finite impulse response (FIR) digital filter, an input signal of the FIR digital filter being responsive to an output of the ADC.

13. The system of claim 10, wherein the control circuit is configured to use multiple asymmetry indicators, wherein each asymmetry indicator is based on one or more of the reconstructed ideal channel output values.

14. The system of claim 13, wherein the asymmetry indicators are selected based on a comparison of multiple, converged, asymmetry matrices generated for different targets for modeling signal nonlinearity caused by magnetic recording channel asymmetry.

15. The system of claim 14, wherein the different targets include a DC target and a DC-free target.

16. The system of claim 13, wherein the asymmetry indicators include a common-time indicator and a separated-time indicator, the common-time indicator comprising a square of a given reconstructed ideal channel output value, and the separated-time indicator comprising a product of two given reconstructed ideal channel output values corresponding to different discrete times.

17. A method comprising:
compensating for asymmetry in an analog signal based on at least one coefficient adjustment to produce a modified signal;
detecting a data sequence in an equalized version of the modified signal to produce a detected data sequence;
reconstructing an ideal channel output from the detected data sequence to produce a reconstructed ideal channel output;
deriving an estimate of nonlinearity from the reconstructed ideal channel output and the equalized version of the modified signal, wherein the reconstructed ideal channel output comprises multiple reconstructed ideal channel output values that correspond to at least two different discrete times; and
modifying the at least one coefficient adjustment to affect the asymmetry compensation based on the estimate of nonlinearity.

18. The method of claim 17, wherein the at least one coefficient adjustment comprises one or more values that are generated at least in part according to an equation, $q_{k+1}=q_k+\mu_1\beta-\mu_2\chi$, where $q_k$ is an asymmetry correction coefficient at time k, $\mu_1$ and $\mu_2$ are programmable step sizes, $\beta_{k+1}=\beta_k+\mu_b\cdot(y_k^r-y_k^a)\cdot y_k^d\cdot(y_{k+1}^d-y_{k-1}^d)$, $\chi_{k+1}=\chi_k+\mu_c(y_k^r-y_k^a)\cdot y_k^d\cdot y_k^d$, $\mu_b$ and $\mu_c$ are step sizes, $y^r$ corresponds to the equalized version of the modified signal, $y^d$ corresponds to an estimated ideal channel output, and $y^a$ corresponds to an estimated real equalized channel output with asymmetry taken into account.

19. The method of claim 17, wherein deriving the estimate of nonlinearity comprises using multiple asymmetry indicators, wherein each asymmetry indicator is based on one or more of the reconstructed ideal channel output values.

20. The method of claim 19, wherein the asymmetry indicators are selected based on a comparison of multiple, converged, asymmetry matrices generated for different targets for modeling signal nonlinearity caused by magnetic recording channel asymmetry.

21. The method of claim 19, further comprising:
controlling relative contributions of the multiple asymmetry indicators based on programmed input, wherein the asymmetry indicators include a common-time indicator and a separated-time indicator.

\* \* \* \* \*